United States Patent
Moraw et al.

[15] 3,705,768
[45] Dec. 12, 1972

[54] COPYING APPARATUS

[72] Inventors: Roland Moraw, Naurod; Reinhold Arneth, Budenheim, both of Germany

[73] Assignee: Kalle Aktiengesellschaft, Wiesbaden-Biebrich, Germany

[22] Filed: March 9, 1971

[21] Appl. No.: 122,408

[30] Foreign Application Priority Data

March 10, 1970 Germany.....................P 20 11 241.8

[52] U.S. Cl. ..........................355/8, 355/11, 355/16, 355/48
[51] Int. Cl........................G03b 27/48, G03b 27/50
[58] Field of Search...............355/1, 8, 11, 16, 48–51

[56] References Cited

UNITED STATES PATENTS 3,125,013   3/1964   Herrick, Jr. et al......................355/1

*Primary Examiner*—Samuel S. Matthews
*Assistant Examiner*—Richard A. Wintercorn
*Attorney*—James E. Bryan

[57] ABSTRACT

This invention relates to a copying apparatus employing a reflex exposure device in which a master and a copying material are conducted in the same direction past, and at a short distance from, the opposite ends of a bar-like fiber optic element.

10 Claims, 1 Drawing Figure

PATENTED DEC 12 1972
3,705,768
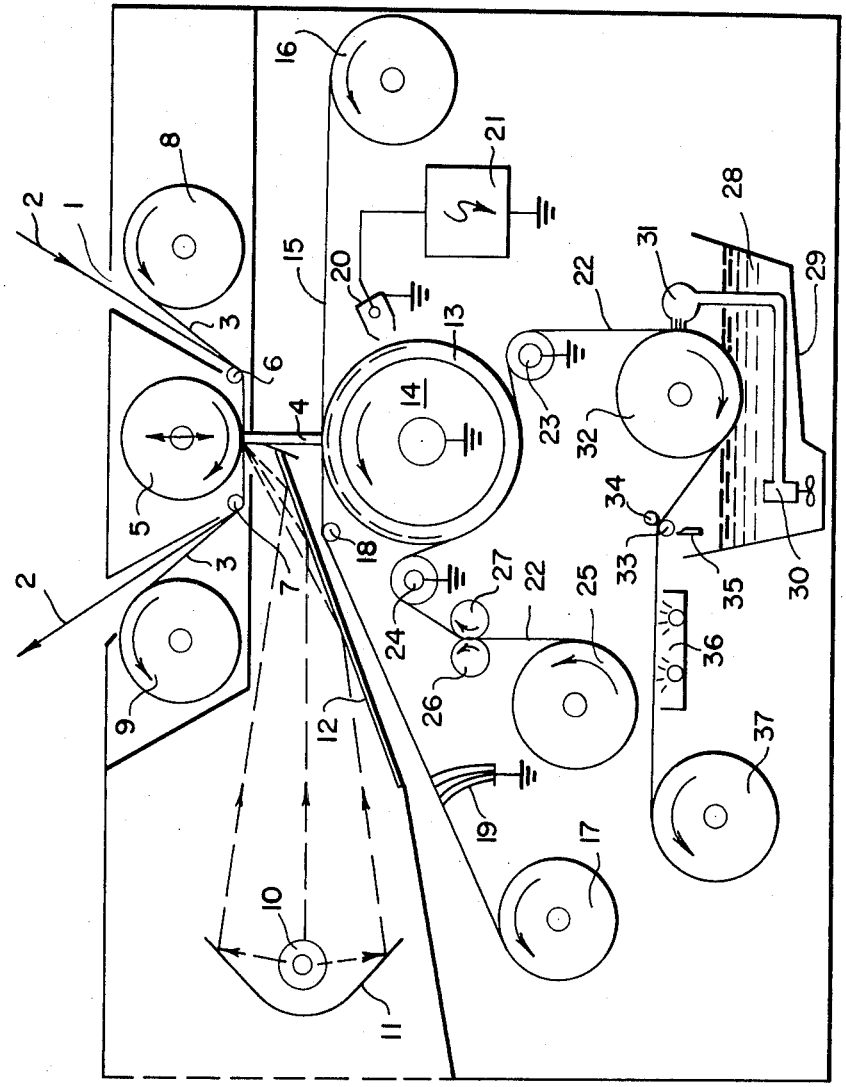
INVENTORS
ROLAND MORAW
REINHOLD ARNETH
BY James E. Bryan
ATTORNEY

COPYING APPARATUS

A copying apparatus is known in which the master and the copying material are conducted in opposite directions past the ends of a glass fiber optic element. Vertical images which are right-reading are obtained directly on the copying material, see German Pat. Specification No. 1,157,073.

Another copying apparatus employing a bar-like glass fiber optic element is known in which the master and the copying material are conducted in the same direction past the ends of the optic element, see German Pat. Specification No. 1,168,242. In this case, vertical laterally reversed images are obtained on the copying material.

The use of glass fiber optic elements has proved superior to the use of optical lens elements in that compact apparatus can be constructed with the former, since the object plane of the master and the image plane of the copying material can be placed at a distance of a few millimeters from one another, independently of the width of the reproduction which is limited only by the length of the glass fiber optic element.

Both known embodiments have the disadvantage that the master and the copying material must be conducted past the ends of the glass fiber optic element at a distance of a few tenths of a millimeter or less. It has been suggested to cover the ends of the optic element with transparent intermediate parts. The impeding friction between the guided material and the intermediate parts is not avoided thereby, however. The intermediate parts become turbid so that the quality of reproduction decreases. Moreover, the necessary change of the intermediate parts is difficult and expensive.

It also has been suggested to replace fixed intermediate parts by slidable transparent films, see German Utility Pat. Specification No. 6,812,905. A copying apparatus according to this suggestion with a glass fiber optic element and the conveyance of master and copying material in opposite directions requires relatively light-sensitive copying materials on which the permanent image is produced directly. They contain light-sensitive layers of silver halides or zinc oxide, for example. The copying materials are, therefor, stiff or heavy, which is often regarded as a disadvantage. Furthermore, it is often desirable to produce images on transparent films which may find use in the diazotype field as intermediate originals.

In order to permit separation of the light-sensitive layer and the final image carrier, it is necessary to produce a laterally reversed intermediate image so that, by means of a transfer procedure, a final vertical laterally correct image results on the support material selected.

The present invention overcomes the above-mentioned drawbacks of the glass fiber optic elements and provides, with the use of bar-like fiber optic elements, a compact copying apparatus by means of which laterally reversed intermediate images can be produced.

The copying apparatus employs a reflex exposure device in which the master and the copying material are guided in the same direction past, and at a small distance from, the opposite ends of a bar-like fiber optic element. Between the master and one front end of the fiber optic element, an optically clear film is guided together with the master. If desired, another optically clear film between the copying material and the other front end of the fiber optic element is guided together with the copying material and a device is provided to transfer a charge image from the copying material on which vertical laterally reversed electrostatic intermediate image is produced onto an image-receiving material in virtual contact therewith and without an external electric field.

In case a film is guided between the fiber optic element and the copying material, it is also possible to guide this film, together with the film between the master and the other front end of the fiber optic element, as a single film in the form of an endless web.

The guided films serve as spacing and sliding films and are of optically clear, tear-resistant material, e.g., of cellulose acetate, polypropylene, polester, or the like. In order to prevent abrasion by dust particles, the films are passed through a cleaning station, e.g., through felt plates. Since Sin-e films of this type have standard thicknesses and are inexpensive, it is possible in a very simple manner to guide the master and, if desired, the copying material at a constant distance of about 0.01 to 0.1 mm or more from the fiber optic. The use of the films avoids the friction between the fiber optic and the materials to be conducted past it, which are of different surface roughness and surface hardness, and reduces the friction into a relatively small and determined friction between the film and the fiber optic. Since the films furthermore are softer than is the fiber optic element, abrasion occurs only on the films. But, compared with the fiber optics, the films are inexpensive and can be replaced easily. The sliding capacity of the films on the fiber optics may be improved by applying an oil film which simultaneously improves the optical transparency. The oil film may be applied to the film by means of a felt strip soaked in an immersion oil. Before the film is wound up, the oil is removed again by a dry felt strip.

Suitable fiber optics are those of glass as well as those of plastic materials.

The use of the slidable film leads to another advantage in that, by means of the film which is long compared with the thickness of the fiber optics, light can be better radiated into the space between the fiber optics and the master than with the hitherto known spacers, the dimensions of which correspond to the thickness and length of the glass fiber optics. The light necessary for exposure is radiated obliquely directly beside the fiber optics onto the film. Upon penetration of the film, the light is refracted at the horizontal boundary surface in the direction of the master and passes through the film to the master, where it is imagewise differentiated and reflected, and passes through the film to the front end of the fiber optics. When using a spacer of the size of the front end of the glass fiber optics only, the light radiated directly besides the glass fiber optics is refracted at a vertical boundary surface, substantially away from the master, exposure of the master being impaired thereby.

Transferable intermediate images are obtained from different copying materials. All imagewise differentiations on printing plates, especially offset printing plates, represent such transferable intermediate images since, starting from these printing plates provided with images, paper or other support materials can be printed. The light-sensitive layers of such printing plates consist, for example, of polymerizable unsaturated compounds, of diazo compounds, of silver salts in colloids or of organic or inorganic photoconductors.

Particularly with photoconductive layers, there are suitable copying systems in which, first an intermediate image in the form of a charge image or a toner image is formed on the photoconductive layer, which image is then transferred with lateral inversion to another material, such as paper. In contradistinction to copying layers on printing plates, layers with photoconductors always may be used again for new images so that such a photoconductive layer is left on a strip or a drum in the copying apparatus and only the image-receiving material is introduced into the apparatus.

Such a known copying system comprises a conductive drum with a selenium layer on which the charge image, produced by charge and exposure, is developed, according to the cascade method, with toner powder. The toner image is transferred from the selenium layer by means of an external electric field to paper and thermoset there.

The copying system of the present invention includes the transfer of the charge image in virtual contact without an external electric field, and is distinguished by a particularly simple construction.

The invention will be further illustrated by reference to the accompanying drawing which is a schematic representation of one embodiment thereof. A sheet-like master 2 is inserted through the slot 1 in the cover plate into the apparatus and guided together with a transparent film 3 past one front end of the bar-like glass fiber optics 4. The roller 5, mounted flexibly in the direction of the arrow, provides constant contact between the master and the transparent film. By means of two auxiliary rollers 6 and 7, the master 2 and the transparent film 3 are guided free of tension in the zone of the glass fiber optics 4 perpendicularly to the front end thereof so that the pressure exerted by the roller 5 need not be greater than necessary. Furthermore, the roller 5 may be of elastic material. The transparent film 3 is wound from roller 8 onto roller 9. A rewinding mechanism (not shown) returns the unwound film 3 after every exposure; it is also possible, however, to use a large supply of film and to return the unwound film only after a certain number of reproductions. With a certain supply of film, it is also possible to guide a piece of film to and fro several times and to occasionally wind the scratched film from the roller 8 onto the roller 9 so that always a new length of film is periodically guided past the glass fiber optics 4. The glass fiber optics 4 may have such a width — about 0.3 to 3 mm — that light can be radiated into the space occupied by the transparent film 3 between the master 2 and the front end of the glass fiber optics 4. The height of the glass fiber optics may be about 5 cm and may be as little as a few millimeters. In a test apparatus, the height of the glass fiber optics was 9 mm. The length of the glass fiber optics is determined by the width of the master to be copied.

A flat arrangement of the light source 10 is suitable for a compact construction of the apparatus, the angle of the central ray to the exposure plane ranging from 10° to 45°, preferably from 15° to 35°. By means of an additional deflecting mirror, the angle may be reduced to 0°. The light source is surrounded by an elliptical reflector 11. The rod-shaped lamp is positioned in one of the focal lines of the ellipse; the other focal line is projected onto the master above the glass fiber optics. A deflecting mirror 12 facilitates a flat ray conduction. The imagewise differentiated light reflected from the master 2 passes through the transparent film 3 and through the glass fiber optics 4 onto the light-sensitive layer 13 which, in the present case, is a charged photoconductive layer of organic charge transfer complexes, or contains them as substantial constituents. Particularly suitable are charge transfer complexes of poly-N-vinyl carbazole and 2,4,7-trinitro-9-fluorenone in a molar ratio of 1 : 1, calculated on the monomer unit. The photoconductive layer is mounted on a grounded metal drum 14. With a light-sensitive layer within the apparatus as in the present case or with recording materials with standard thicknesses on a suction drum, for example, it may be achieved by precision adjustment that the light-sensitive layer, also without an additional transparent film, passes at a distance of about 0.1 mm past the other front end of the glass fiber optics.

It is also possible to employ a transparent insulating film 15 at the other front end of the glass fiber optics 4, which film is unwound from the roller 16 and onto the roller 17, an auxiliary roller 18 allowing tension-free guidance of the film 15 perpendicularly to the glass fiber optics 4. The same discussion of rollers 8 and 9 applies correspondingly to rollers 16 and 17.

It is also possible, if desired, to guide films 3 and 15 in the form of a single web past both front ends of the glass fiber optics 4.

It is possible to flexibly mount the drum 14 as well as to exert the elastic pressure of the glass fiber optics 4 and the roller 5 onto the drum 14, which is preferable because of the relatively large mass of the drum 14. The film 15 advantageously is discharged, e.g., by means of a grounded metal brush 19. The photoconductive layer 13 which is applied in thicknesses of about 4 to 15 $\mu$ is charged by means of a corona discharge unit 20, 21 to about - 1,000 volts. The charge image is transferred by virtual contact from the photoconductive layer 13 to the insulating image-receiving layer 22, the support materials of the photoconductive layer and the image-receiving layer (13, 22) being grounded.

The image-receiving material 22 is a paper support sufficiently conductive for electrophotographic purposes (3 × 10$^8$Ω□ at 20 percent relative humidity) with an insulating layer which contacts the photoconductor layer 13 during transfer of the charge image. The paper support is grounded by rollers 23 and 24. The image-receiving material is drawn from a supply roll 25 by carrier rollers 26 and 27 running synchronously with the master 2.

By exposure to light, a vertical laterally reversed charge image is produced on the photoconductive layer 13, which image is transferred onto the image-receiving material 22 as a vertical laterally correct image. The charge image on the image-receiving material 22 is converted into a visible image by means of a liquid dispersion developer 28 in a trough 29. For the purpose of development yielding images of better contrast, developer is sprayed by means of pump 30 and nozzle 31 onto the image-receiving material which, additionally, is immersed into the developer by means of roller 32. The squeeze rollers 33 and 34 with a doctor knife 35, as well as the infrared radiators 36, dry the copies which are then wound onto roller 37 or can be directly delivered from the copying apparatus.

Variations of the above, e.g., the use of two light sources on the images side or the use of endless films along the front end of the glass fiber optics are possible. It is also possible to construct an apparatus operating according to the same procedure, in which copies of books can be made.

It will be obvious to those skilled in the art that many modifications may be made within the scope of the present invention without departing from the spirit thereof, and the invention includes all such modifications.

What is claimed is:

1. In a copying apparatus having a reflex exposure device in which a master and a copying material are conveyed in the same direction past and at a small distance from the opposite ends of a bar-like fiber optics element, the improvement comprising means for conveying an optically clear film together with the master and between the master and one front end of the fiber optics element, and means for transferring a charge image from the copying material onto an image-receiving material without the use of an external electric field.

2. A copying apparatus according to claim 1 including means for conveying another optically clear film between the copying material and the other end of the fiber optics element.

3. A copying apparatus according to claim 2 including auxiliary roller means whereby the fibers are conveyed free of tension.

4. A copying apparatus according to claim 2 in which the supply of film exceeds the conveying paths between winding-off and winding-up rollers.

5. A copying apparatus according to claim 1 in which the copying material and the image-receiving material are in contact.

6. A copying apparatus according to claim 1 in which the means for transferring the charge image has a photoconductive layer on the surface thereof.

7. A copying apparatus according to claim 6 in which the photoconductive layer comprises organic charge transfer complexes.

8. A copying apparatus according to claim 6 in which the photoconductive layer comprises poly-N-vinylcarbazole and 2,4,7-trinitro-9-fluorenone in a molar ratio of 1 : 1, calculated on the monomeric units.

9. A copying apparatus according to claim 1 including a light source mounted at an angle of 10° to 45° to the exposure plane.

10. A copying apparatus according to claim 9 including a deflecting mirror in the path of rays from the light source.

* * * * *